US005715668A

United States Patent [19]
Filion et al.

[11] Patent Number: 5,715,668
[45] Date of Patent: Feb. 10, 1998

[54] SELF-ADJUSTABLE RAKE FOR OVERFLOW GRATES

[75] Inventors: Gilles Filion, Kirkland; Martin Couture, Chomedey, both of Canada

[73] Assignee: John Meunier Inc., Montréal, Canada

[21] Appl. No.: 662,773

[22] Filed: Jun. 10, 1996

[51] Int. Cl.$^6$ .................................................. B01D 35/02
[52] U.S. Cl. ............................................ 56/400.21; 210/159
[58] Field of Search ........................... 56/400.01, 400.02, 56/400.21; 19/80 R, 145.5; 210/159, 160, 162, 163

[56] References Cited

U.S. PATENT DOCUMENTS

| | | | |
|---|---|---|---|
| 4,521,306 | 6/1985 | Day | 210/159 |
| 4,645,598 | 2/1987 | Hannum | 210/232 |
| 4,780,199 | 10/1988 | Ezzell et al. | 210/159 |
| 5,051,174 | 9/1991 | Nungaray | 210/159 |
| 5,425,875 | 6/1995 | Duperon | 210/159 |

*Primary Examiner*—Terry Lee Melius
*Assistant Examiner*—Robert Pezzuto
*Attorney, Agent, or Firm*—F. Martineau

[57] ABSTRACT

A rake, in which its tines are inserted and moved between the parallel, uniformly spaced, bars of a grating for debris removal. The rake includes a base and plurality of equally spaced parallel tines forming blades integrally moulded with the base out of a thermoplastic with memory characteristics. The thickness of each blade is about 1/16 its width, each blade is easily flexible thicknesswise, that is in a direction transverse to the grating bars but has practically no flexibility in the direction of the grating bars. The distance between the grating bars is two to four times the rake tines thickness so that at least two rake tines can be inserted between two adjacent grating bars.

7 Claims, 2 Drawing Sheets

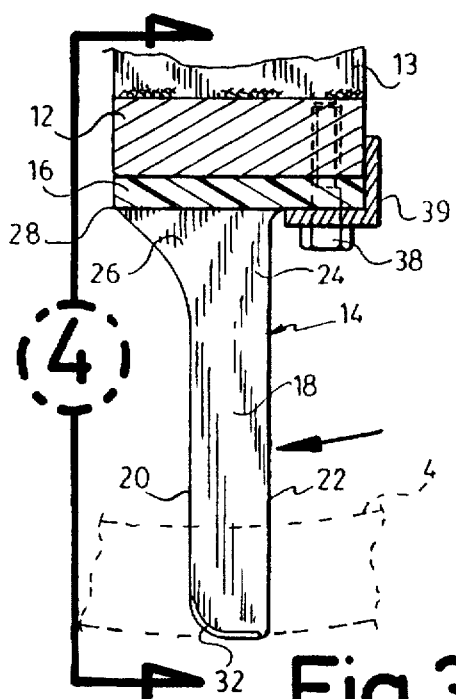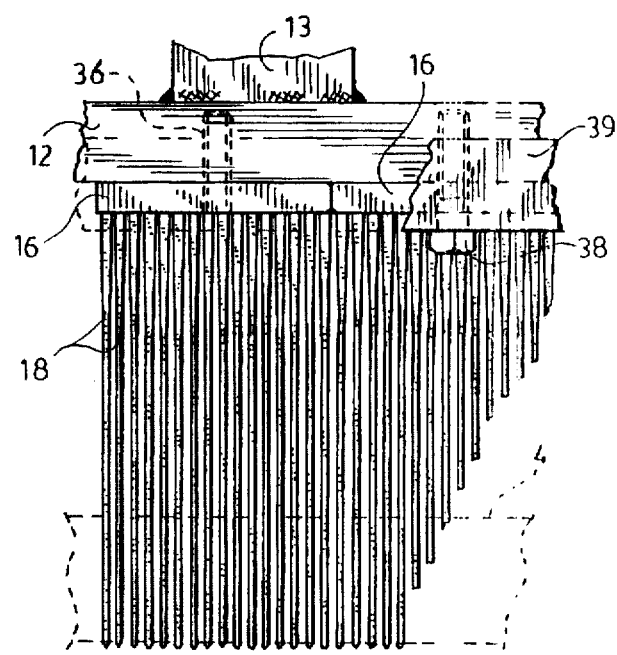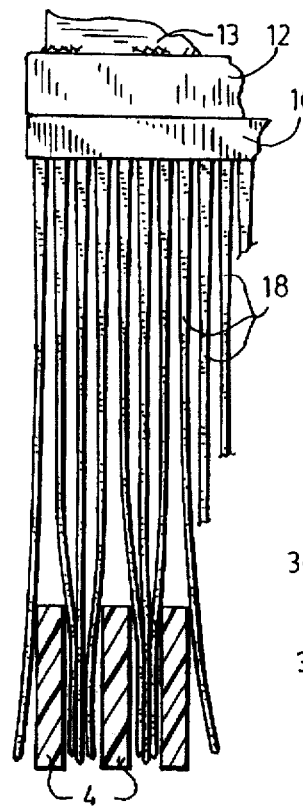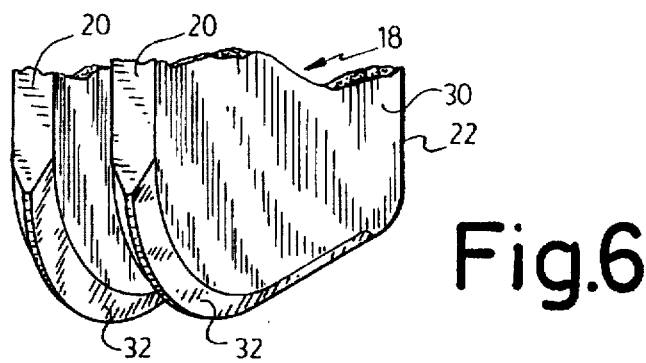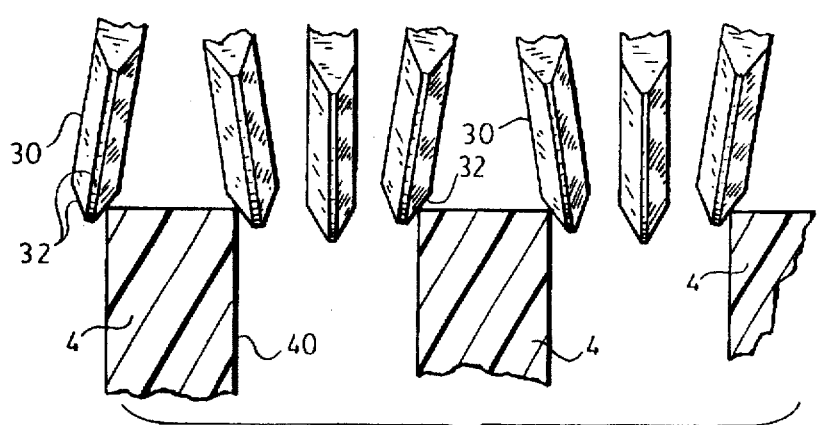

5,715,668

SELF-ADJUSTABLE RAKE FOR OVERFLOW GRATES

FIELD OF THE INVENTION

The present invention relates to a rake for removing solids which accumulate on a grating or screen to screen large quantities of water such as storm waters flowing over a weir.

BACKGROUND OF THE INVENTION

In known devices of the character described, the grating is formed of a set of equally spaced parallel grating bars and the rake is in the form of a comb comprising a base and a plurality of equally spaced tines extending from the base and having a free end portion insertable between the grating bars for movement along the same in order to remove debris accumulated over the bars between which flows the water to be screened.

In known rakes, the tines or teeth generally are non-flexible and it has been found that they often become permanently bent when striking hard debris on the grating thereby causing frequent stoppage of the raking operation. This is now a more frequent happening since the spacing between the grating bars keeps being reduced in order to catch debris of finer size.

In U.S. Pat. No. 4,521,306 dated Jun. 4th, 1985, titled "Mechanically raked bar screen with conveyor system having elastomeric rakes", inventor John T. Day, the rake tines are transversely flexible but have a thickness equal to the space between adjacent grating bars to closely fit the latter. This arrangement requires precise alignment of the rake tines with the spaces between the grating bars.

OBJECTS OF THE PRESENT INVENTION

It is the main object of the present invention to provide the combination of a rake with a grating made of parallel grating bars which obviates the above noted disadvantages.

Another object of the present invention is to provide a rake of the character described which does not break down or become permanently deformed when striking hard particles on the grating.

Another object of the present invention relates to a rake of the character described which is of modular construction, each module removably secured to a raking bar and formed of a small number of tines.

Another object of the present invention is to provide a rake of the character described wherein each module, including a set of tines and a base, are moulded in one piece out of a thermoplastic material with memory.

Yet another object of the present invention is to provide a rake which can clear gratings of different bar spacings.

SUMMARY OF THE INVENTION

There is disclosed a rake for raking a set of equally spaced, parallel grating bars of a grating, said rake comprising a base and a plurality of equally spaced parallel tines formed of blades extending from said base, secured thereto at one end and having a free outer end portion insertable between adjacent said grating bars for movement along said grating bars, the flexibility of said blades relative to said base being high transverse to the direction of said movement and substantially nil in the direction of said movement, the distance between the grating bars being two to four times the thickness of the rake tines.

Preferably, the base and the tines are integrally moulded in one piece out of a thermoplastic with memory.

Preferably, said base is a rectangular block having a longitudinal axis and said tines are blades of rectangular cross-section with a longitudinal axis transverse to the longitudinal axis of said block, said blades having a zone of decreasing thickness in the direction from said base to said outer end portion.

Preferably, said zone extends from said base and terminates at about ½ the total distance of the tip of said blades from the back face of said block, the portion of each blade external of said zone being of substantially equal thickness.

Preferably, the thickness of said external portion of said blade is equal to about 1/16 the width of said blade.

Preferably, the width of said base is greater than the width of said blades, each blade having parallel, longitudinal, upstream and downstream edges in the direction of movement along said grating bars and further having a bracing enlargement at its upstream edge and merging with said base, said base having a portion trailing said downstream edges of said blades provided with a bolt hole for securing the rake to a supporting structure.

Preferably, said tip is rounded at its upstream edge and is bevelled widthwise.

Preferably, each blade has a width of about one inch and a thickness of about 1/16 of an inch, each blade having a length of about 6 inches, therebeing about sixteen blades integral with one block with a spacing of about ⅛ of an inch, each block having a length of about three inches and several rakes being securable to a rake bar in end-to-end relation.

BRIEF DESCRIPTION OF THE DRAWINGS

FIG. 3 is a cross-section of the rake;

FIGS. 4 and 5 are partial elevations of the rake;

FIG. 6 is a partial perspective view of the tips of the rake tines; and

FIG. 7 is a partial elevation of the rake tines entering between rake bars shown in cross-section.

DETAILED DESCRIPTION OF THE PREFERRED EMBODIMENT

Figure 1:
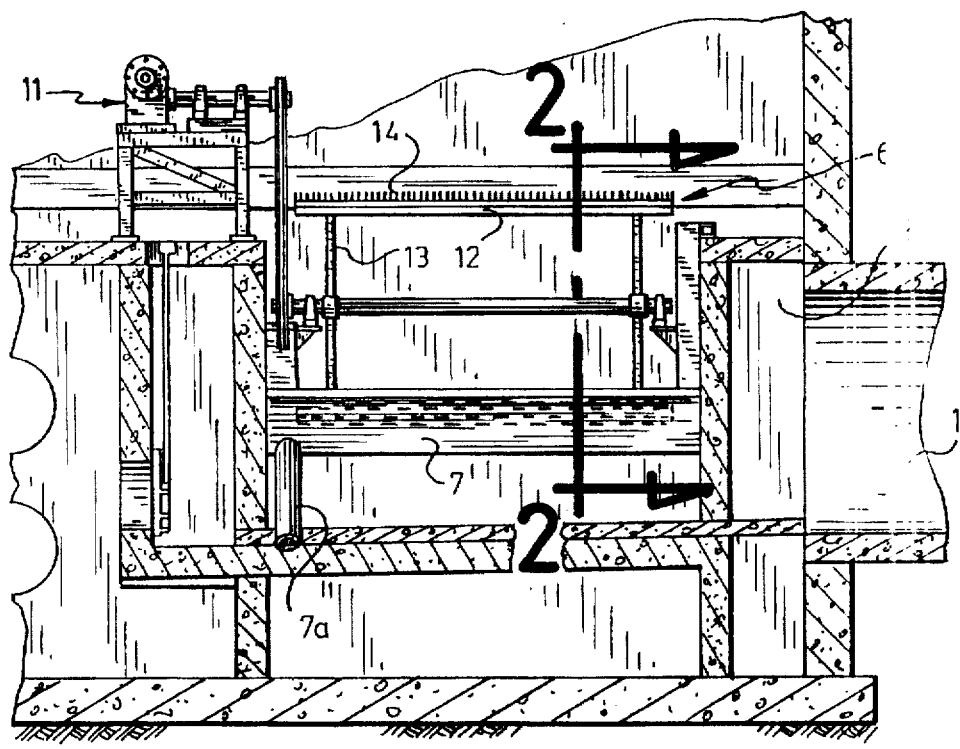
FIG. 1 is a vertical section of a storm water overflow screen with a rake in accordance with the invention.
Figure 2:
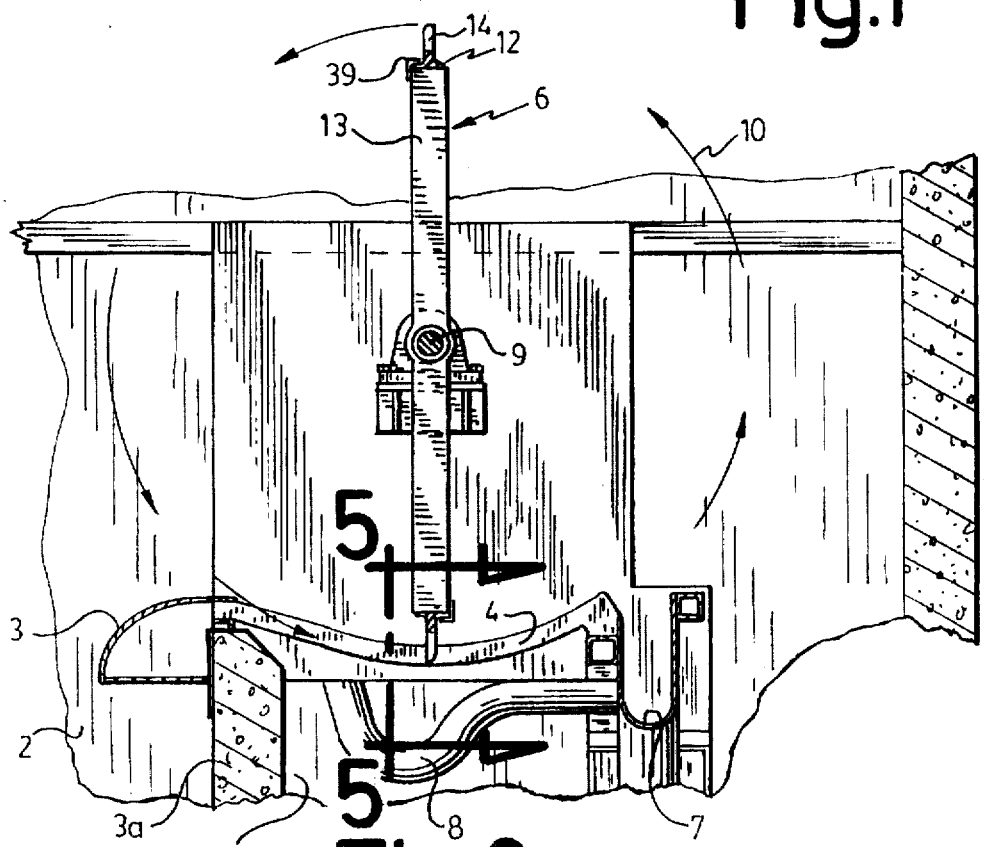
FIG. 2 is a partial section taken along line 2—2, of FIG. 1.

FIGS. 1 and 2 show a typical installation of a grating and of a rake used in association with the grating. A great quantity of water such as storm water enters a reservoir 2 through an inlet pipe 1, the water from the reservoir is discharged over the lip 3 of a weir 3a and through a grating consisting of parallel bars 4 which are equally spaced. In the typical installation shown, the bars are longitudinally arched in the form of a portion of a circle and are disposed in a generally horizontal plane. The cleaned water is freely discharged to the exterior by a duct 5. Solid particles and detritus filtered by the grating bars 4 is swept by the raking apparatus 6 into a trough 7 and is transported to a treatment plant by a duct 7a. A pipe 8 connected to the reservoir 2 feeds a restricted amount of water to the trough 7 to facilitate carrying away of the screenings.

The raking apparatus 6 comprises a shaft 9 located above and coaxial with the grating bars 4 and driven in rotation in accordance with arrow 10 by a driving system generally shown at 11 in FIG. 1. Two parallel rake bars 12 are fixed by radial arms 13 to the shaft 9 in diametrically opposed relationship and the two rake bars 12 each carry a rake in accordance with the invention. This rake consists of a series of modular rake units 14 secured to the bars 12 in end-to-end relationship. Each rake module 14 includes a base 16 in the form of a block of rectangular shape when seen in top plan view and from one main face of which extends a set of several tines 18. The base 16 and tines 18 are integrally moulded in one piece out of a flexible thermoplastic material, with memory, so that when the tines 18 are deflected they automatically return to their original position. A preferred material is an acetal resin supplied by Dupont under the registered trade mark Debrin or by Hoechst Celanese Corporation under the registered trade mark Celcon. Tines 18 are much thinner than wide, for instance typically having a thickness of 1/16 of an inch and of a width of 1 inch. Each tine forms a blade which has straight and parallel upstream and downstream longitudinal edges 20 and 22 respectively over the greater part of their length with the exception that the root portion 24 of each blade is reinforced along its upstream longitudinal edge 20 by a curved bracing enlargement 26 merging with the upstream edge 28 of the base 16. The blades are all parallel in their unstressed condition and are equally spaced and lie in planes which are normal to the longitudinal axis of the rectangular base 16. Except for the root portion 24 which has a progressively decreasing thickness in a direction away from base 16, the outer portion of the blades has a uniform thickness, as shown in FIG. 5. The tip 30 of each blade 18 is rounded at the upstream side of the blade and is transversely double bevelled, as shown at 32.

Typically, the thickness of the base 16 is about 3/8 of an inch and the length of each blade is about 5 5/8 inch. Each base 16 has a downstream flat portion 34 protruding from the downstream edge 22 of the blades and having a throughhole 36 for fastening the base to the rake bars 13 by suitable fasteners such as bolts 38 and by an angle bar 39 overlaying the several bases 16 and the rake bar 12.

Each rake module 14 has about 16 tines 18. Typically, the base 16 has a length of 3 inches with the hole 36 centred with respect to the base flange. Typically, the blades are spaced apart a distance of about 1/8 of an inch. The grating bars 14 have normally a rectangular cross-section with a flat top edge but which could be double bevelled. Depending on the width of the interbar slots 40, between one and four tines 18 can insert themselves within any interbar slot 40 (see FIGS. 4 and 7). In practice the width of each interbar slot 40, namely the distance between two adjacent grating bars 4, is two to four times the thickness of each tine 18. Therefore, the same modules 14 can be used with grating bars of different bar pitch or of different width of interbar slot 40. Also there is no need to provide a system for precisely adjusting the rake modules 14 transversely of the grating bars 4.

If a tine 18 strikes solids upon attempting an insertion into its normal interbar slot 40, it will simply laterally deflect and insert itself into the adjacent interbar slot.

Obviously, the same rake modules 14 may be used in a rake assembly which travels back and forth in linear paths to be used in association with straight grating bars.

The embodiments of the invention, in which an exclusive property or privilege is claimed, are defined as follows:

1. A debris removal system for removing debris from a fluid flow channel comprising a grating positioned in a fluid flow channel and including series of parallel grating bars spaced a uniform distance from each other, at least a rake made of flexible thermoplastic material with memory and including a base and a series of parallel, spaced blades integral with and protruding from said base, said blades having an outer portion terminated by a blade tip, said outer portion insertable between said grating bars, and conveyor means for moving said rake along said grating bars in a debris removing direction with said outer portion of said blades inserted between said grating bars for removal of debris from said grating, each blade being of rectangular cross-section and disposed with the width of said blades being parallel to said debris removing direction and the thickness of said blades being transverse to said debris removing direction, said width being several times said thickness so that the flexibility of each blade relative to said base is high transverse to said debris removing direction and substantially nil in said debris removing direction, said distance between grating bars being between two and four times said thickness so that at least two blades can be inserted between two adjacent grating bars during said removal of said debris.

2. A debris removal system as defined in claim 1, wherein, said base is a rectangular block having a longitudinal axis and said blades have a longitudinal axis transverse to the longitudinal axis of said block, said blades having a zone of decreasing thickness in the direction from said base to said tip, said zone extending from said zone to said outer portion, said outer portion being of substantially uniform thickness.

3. A debris removal system as defined in claim 2, wherein the thickness of said outer portion of said blade is equal to about 1/16 the width of said blade.

4. A debris removal system as defined in claim 3, wherein the width of said base is greater than the width of said blades, each blade having parallel, longitudinal, upstream and downstream edges in the direction of movement along said grating bars and further having a bracing enlargement at said upstream edge and merging with said base, said base having a portion trailing said downstream edges of said blades provided with a bolt hole for securing the rake to a supporting structure.

5. A debris removal system as defined in claim 4 wherein said tip is rounded at said upstream edge and is bevelled widthwise of said blade.

6. A debris removal system as defined in claim 5, wherein each blade has a width of about one inch and a thickness of about 1/16 of an inch, each blade having a length of about 6 inches, therebeing about sixteen blades integral with one block with a spacing of about 1/8 of an inch, each block having a length of about three inches and several rakes being securable to a rake bar in end-to-end relation.

7. A debris removal system as defined in claim 1, wherein said thermoplastic material is an acetel resin.

* * * * *